J. LEHNE.
ROTARY PUMP.
APPLICATION FILED JAN. 11, 1912.

1,038,769.

Patented Sept. 17, 1912.

2 SHEETS—SHEET 1.

Witnesses

Inventor
Josef Lehne

J. LEHNE.
ROTARY PUMP.
APPLICATION FILED JAN. 11, 1912.
1,038,769.
Patented Sept. 17, 1912.
2 SHEETS—SHEET 2.
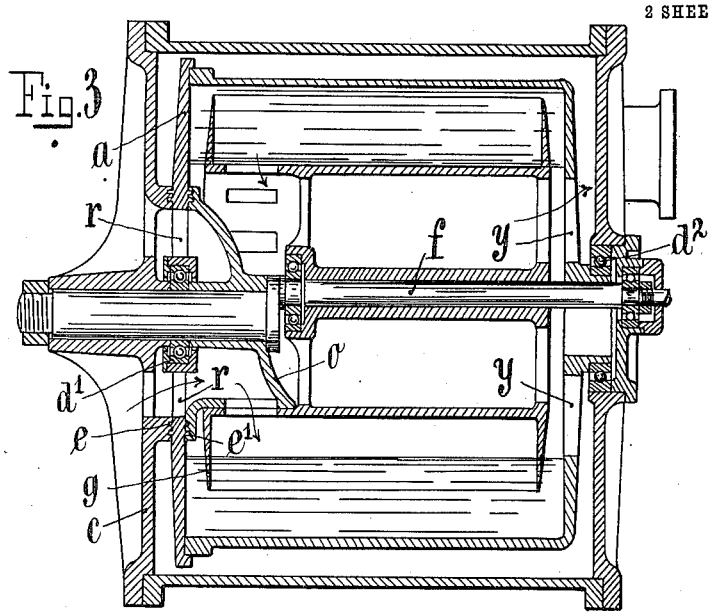
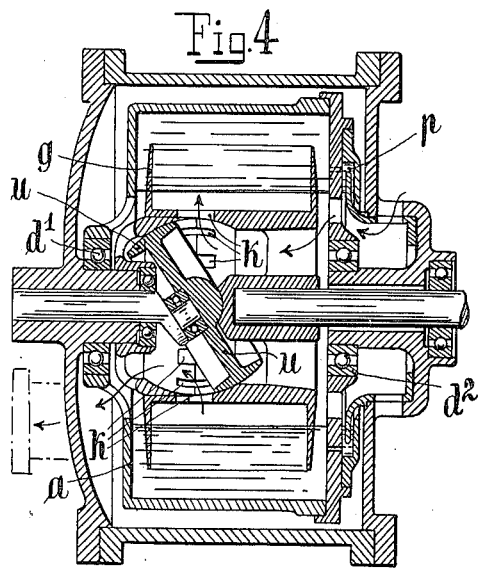
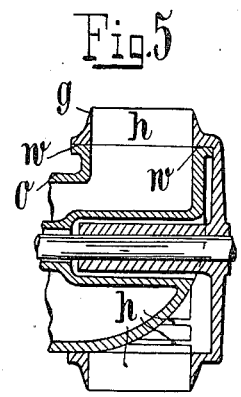
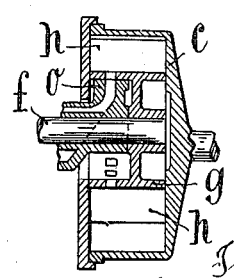
Witnesses
Inventor
Josef Lehne

UNITED STATES PATENT OFFICE.

JOSEF LEHNE, OF CHARLOTTENBURG, GERMANY, ASSIGNOR TO INTERNATIONALE ROTATIONS-MASCHINEN-GESELLSCHAFT M. B. H., OF BERLIN, GERMANY.

ROTARY PUMP.

1,038,769.  Specification of Letters Patent.  Patented Sept. 17, 1912.

Application filed January 11, 1912. Serial No. 670,625.

*To all whom it may concern:*

Be it known that I, JOSEF LEHNE, a subject of the Grand Duke of Hesse, residing at Charlottenburg, Germany, have invented certain new and useful Improvements in Rotary Pumps; and I do hereby declare the following to be a full, clear, and exact description of the invention, such as will enable others skilled in the art to which it appertains to make and use the same.

In rotary pumps in which a vane or cellular wheel coöperates with a working and jointing liquid ring produced by centrifugal force in a surrounding stationary chamber under the influence of the rotating cellular wheel, a great loss of energy results and the fluid heats greatly on account of the high frictional resistance of the liquid ring on the walls of the stationary chamber. According to the present invention these troubles are avoided, by a freely rotatable drum being provided to receive the working liquid which drum is revolved by the friction of the liquid, so that the liquid friction is replaced by the much smaller bearing friction of the drum.

A further object of the invention consists in providing, in combination with such arrangement, controlling means acting satisfactorily even at high speeds. In order to fulfil this object the cellular wheel is made of a bell shape and the passages in the several cells, serving for the admission and the outlet of the fluid to be conveyed, are controlled by means of a centrally arranged controlling member.

In the accompanying drawings several constructional forms of the invention are exemplified.

Figure 1:
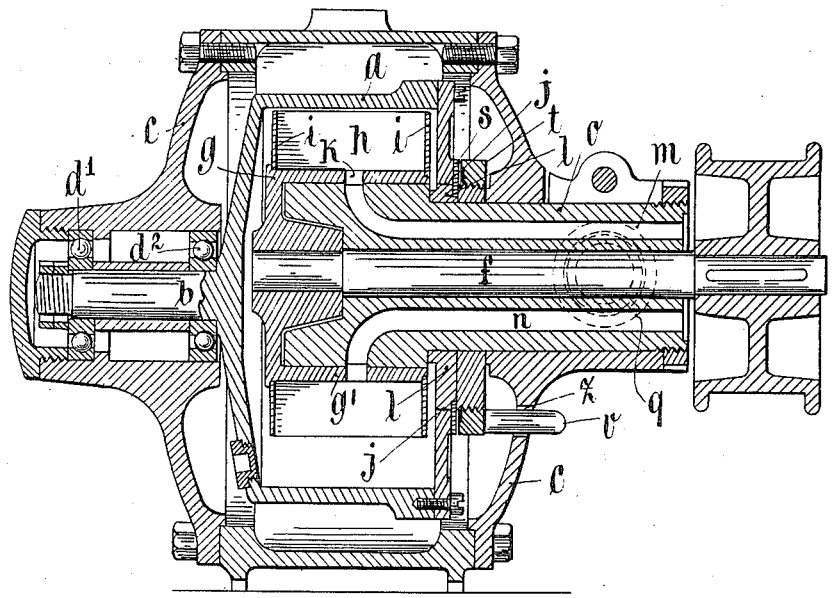
Figure 2:
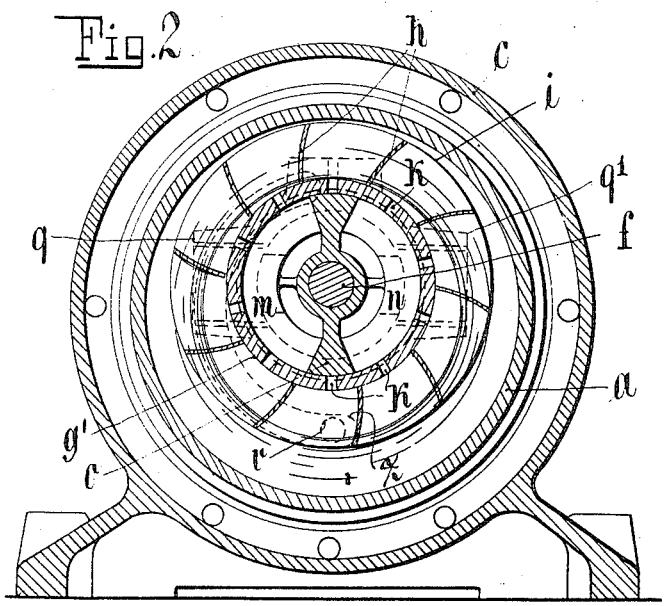

Figures 1 and 2 show the one constructional form in longitudinal and cross section respectively. Figs. 3 and 4 show two further constructional forms in longitudinal vertical section and in horizontal section respectively, and Figs. 5 and 6 are part sections through again other constructional forms.

In Figs. 1 and 2 $a$ is a rotary drum journaled on one side with its shaft $b$ in a casing $c$ in ball bearings $d^1$, $d^2$, and intended to receive the working liquid.

$g$ is the bell shaped body of a cellular wheel fitted to the shaft $f$; vanes $h$ attached to the same form together with side walls $i$, $i$ cells, which are quite open toward outside. In the bottoms of the cells formed by the hollow cylindrical rim part $g^1$ of the wheel body are provided passage openings $k$, which are intended as inlets and outlets for the fluid to be conveyed.

$o$ is a stationary valve or controlling member, which contains passages $m$ and $n$ and besides serves as bearing for the shaft $f$.

When the cellular wheel $g$ is driven, the liquid in the drum $a$ will also receive a rotary motion by the action of the vanes of the wheel and will communicate this rotary motion by friction to the drum $a$. At a correspondingly high speed a liquid ring will be formed along the circumference of the wall of the drum. The quantity of the liquid inclosed in the drum is preferably made so large, that the liquid ring will completely fill the cells at the point where the distance between the drum $a$ and the cellular wheel $g$ is smallest, so that the air or the like fluid is as completely as possible removed from the cells. On the other hand the dimensions may be so chosen, that on the side of the greatest distance the cells are still closed by the liquid ring.

If the cellular wheel revolves in the direction indicated by the arrow, Fig. 2, the fluid to be conveyed will be sucked through the passage $m$ connected with the suction pipe $q$, as on this side the volume of the cells not filled by the working liquid is increased, while the fluid is forced out through the passage $n$ connected with the delivery pipe $q^1$, by being displaced by the liquid entering into the cells. The circumferential dimension of the controlling opening of the passage $n$ must be made, according to the working pressure, larger or smaller, so that the communication with the passage $n$ is produced only after the pressure in the cells has reached the same height as the pressure in the delivery pipe, and no back pressure nor an excessive compression will be produced.

In order to prevent the liquid from emerging from the drum $a$ when the machine is standing idle, the following provision has been made. On the controlling member $o$ is fitted an eccentric ring $l$, the circumference of which is concentrically arranged to the drum $a$. The gap $j$ between this ring and the correspondingly recessed face wall of the drum $a$ can be closed by means of a packing ring $s$, which can be forced against the gap $j$ by the turning of a threaded ring $t$, which is provided with a handle $v$ projecting toward outside through a curved slot $z$ in the casing $c$. The thread is preferably so arranged, that when the machine is started, the packing will release itself.

In the construction shown in Fig. 3 the bearings $d^1$, $d^2$ are arranged on different sides of the drum $a$, the bearing $d^2$ at the right hand being disposed eccentrically around the shaft $f$ of the vane or cellular wheel $g$. In a similar manner this shaft $f$ is journaled in bearings at both ends. In this construction further the controlling member $o$ has one passage only, for instance a suction passage, while the compressed fluid has free passage to the casing $c$, being preferably conducted axially through the wheel $g$ and through openings $y$ in the right hand face wall of the drum $a$, so as to deposit in the wheel, by the centrifugal action, any particles of the working liquid which it may have carried along. The rotary drum $a$ is tightly jointed against the stationary casing $c$ and the stationary controlling member $o$ by the labyrinth chamber packings $e$ and $e^1$ respectively. The controlling member does not extend to the outside and the communication with the atmosphere or any other room from which the fluid is conducted to the pump, is obtained by openings $r$ arranged around the bearing $d^1$ in the left hand face wall of the drum $a$, so that the bearing $d^1$ may be made of very small dimensions, compared with a construction where it would be arranged around a controlling member extending to the outside as in Fig. 1.

According to the construction of the controlling means shown in Fig. 4, the jointing surface of the bell shaped wheel body $g$ is not of a hollow cylindrical form, but of a hollow spherical form. A disk $u$ having spherically faced flanges, and revolving on an axis obliquely disposed to the main shaft divides the opening of the cells $k$ into two groups, namely into suction and into delivery openings. This disk $u$ is carried along by the friction of the wheel body $g$, so that only an axial frictional component is produced. In Fig. 4 the jointing between the drum and the casing is besides effected by means of a liquid ring at $p$ communicating with the interior of the drum.

In Fig. 5 a constructional form of the cellular wheel is shown, in which the vanes $h$ themselves produce the tight joint on the controlling member $o$. For improving the joint the lateral jointing surfaces are widened at $w$.

Instead of a cellular wheel as shown in Figs. 1-5, with cells closed by disks at the sides, a plain vane wheel $g$ may be used according to Fig. 6, which may be jointed with the side surface against the side walls of the rotary drum $a$.

I claim:

1. In a rotary pump, the combination of a cellular wheel provided with fluid passages, means for positively driving said wheel, a drum adapted to contain a working fluid mounted eccentrically about said wheel for free rotation independent of the latter, and a controlling member slidably engaging said wheel for controlling such fluid passages.

2. In a rotary pump, the combination of a cellular wheel provided with fluid passages, means for positively driving said wheel, a drum adapted to contain a working fluid mounted eccentrically about said wheel for free rotation independent of the latter, and a stationary member for controlling said fluid passages.

3. In a rotary pump, the combination of a cellular wheel having a hollow hub provided with fluid passages, means for positively driving said wheel, a drum adapted to contain a working fluid mounted eccentrically about said wheel for free rotation independent of the latter, and a controlling member slidably engaging the inner surface of said hollow hub.

4. In a rotary pump, the combination of a cellular wheel having a hollow hub provided with fluid passages, means for positively driving said wheel, a drum adapted to contain a working fluid mounted eccentrically about said wheel for free rotation independent of the latter, and a controlling member extending in sliding engagement with a portion only of the inner periphery of said hollow hub.

5. In a rotary pump, the combination of a cellular wheel having a hollow hub provided with a series of fluid passages, means for positively driving said wheel, a drum adapted to contain a working fluid mounted eccentrically about said wheel for free rotation independent of the latter, and a controlling member slidably engaging said hollow hub for successively covering such several fluid passages.

6. In a rotary pump, the combination of a drive shaft, a cellular wheel secured thereon and having a hollow hub and side walls, said hub and at least one of said side walls being provided with fluid passages, a drum adapted to contain a working fluid journaled at both ends eccentrically about said wheel for free rotation independent of the latter, and a controlling member slidably engaging the inner surface of said hollow hub for controlling such passages therein.

7. In a rotary pump, the combination of a cellular wheel having a hollow hub and side walls, said hub and at least one of said side walls being provided with fluid passages, journal bearings for the respective ends of said wheel, a drum adapted to contain a working fluid journaled at both ends eccentrically about said wheel for free rotation independent of the latter, and a controlling member slidably engaging the inner surface of said hollow hub for controlling such passages therein.

8. In a rotary pump, the combination of a cellular wheel having a hollow hub provided with fluid passages, means for positively driving said wheel, and a controlling member slidably engaging the inner surface of said hollow hub, the engaging surfaces of said member and hub being of spherical form.

9. In a rotary pump, the combination of a cellular wheel having a hollow hub provided with a spherical surface on its inner periphery and having a series of fluid passages, means for positively driving said wheel, a drum adapted to contain a working fluid mounted eccentrically about said wheel for free rotation independent of the latter, and a rotatably mounted disk having its axis inclined to that of said wheel and provided with a spherical surface for engaging the corresponding spherical surface of said hub to control such fluid passages in the latter.

In testimony whereof, I affix my signature, in presence of two witnesses.

JOSEF LEHNE.

Witnesses:
 AUGUST TRAUTMANN,
 WOLDEMAR HAUPT.